(12) United States Patent
Pessolano

(10) Patent No.: US 7,961,820 B2
(45) Date of Patent: Jun. 14, 2011

(54) PROGRAMMABLE AND PAUSABLE CLOCK GENERATION UNIT

(75) Inventor: Francesco Pessolano, Eindhoven (NL)

(73) Assignee: NXP B.V., Eindhoven (NL)

( * ) Notice: Subject to any disclaimer, the term of this patent is extended or adjusted under 35 U.S.C. 154(b) by 812 days.

(21) Appl. No.: 10/587,608

(22) PCT Filed: Jan. 21, 2005

(86) PCT No.: PCT/IB2005/050245
§ 371 (c)(1),
(2), (4) Date: Jul. 27, 2006

(87) PCT Pub. No.: WO2005/074138
PCT Pub. Date: Aug. 11, 2005

(65) Prior Publication Data
US 2007/0127610 A1   Jun. 7, 2007

(30) Foreign Application Priority Data
Jan. 29, 2004   (EP) .................................... 04100320

(51) Int. Cl.
*H03D 1/00* (2006.01)
(52) U.S. Cl. ........................................................ 375/339
(58) Field of Classification Search .................. 713/500; 375/295, 307, 339; 455/146, 209, 315; 331/2, 331/46, 57, 108 C
See application file for complete search history.

(56) References Cited

U.S. PATENT DOCUMENTS

| 4,855,615 | A | 8/1989 | Humpleman et al. | |
|---|---|---|---|---|
| 5,208,557 | A | 5/1993 | Kersh | |
| 5,291,528 | A | 3/1994 | Vermeer | |
| 5,398,244 | A * | 3/1995 | Mathews et al. | 370/448 |
| 5,652,536 | A | 7/1997 | Nookala et al. | |
| 6,138,019 | A * | 10/2000 | Trompower et al. | 455/436 |
| 6,219,797 | B1 | 4/2001 | Liu et al. | |
| 6,522,698 | B1 * | 2/2003 | Irving et al. | 375/272 |
| 2002/0172309 | A1 * | 11/2002 | Cheng | 375/356 |
| 2005/0080999 | A1 * | 4/2005 | Angsmark et al. | 711/150 |

FOREIGN PATENT DOCUMENTS

| EP | 0 613 074 | | 8/1994 | |
|---|---|---|---|---|
| WO | WO 99/21280 | * | 4/1999 | 375/376 |

* cited by examiner

*Primary Examiner* — Sam K Ahn

(57) ABSTRACT

In an example embodiment, a clock generation circuit comprises two programmable ring oscillators arranged and configured to operate in a mutually exclusive manner, and a variable programmable delay element (not shown). An input programming pattern is provided as an input to the oscillating circuit, the programming pattern providing data representative of the sequence of frequencies at which the clock signal is required to be generated. The outputs of both the oscillators are connected to a clock switch (16), from which the generated clock signal is output. When a request for a change of frequency is received, the currently idle oscillator is first activated with the next required frequency, the output of the currently operative oscillator is then gated when the clock signal thereof goes low. Next, the previously gated output of oscillator is un-gated when its output goes low, and then oscillator is de-activated.

15 Claims, 4 Drawing Sheets

PROGRAMMABLE AND PAUSABLE CLOCK GENERATION UNIT

This invention relates to an electronic device for generating a clock signal for an integrated circuit, the device comprising at least one programmable oscillator element for generating a clock signal in response to an input signal, the frequency of said input signal being variable.

There are many circumstances in which it may be required to change the frequency of the operative clock signal in an integrated circuit, for power or performance management. For example, many semiconductor devices are provided with an active and a standby mode of operation. Power consumption in the standby mode is reduced with respect to that in the active mode to increase efficiency during periods of time in which the device is powered up but idle. One method to reduce power consumption in the standby mode is to reduce the frequency of operation of various circuits that must continuously operate while the device is powered up. This may be achieved by providing dual oscillator frequencies: a higher frequency to drive the circuits at full speed during operation in the active mode, and a lower frequency to drive the circuits at a lower speed, thereby reducing the power consumed by the circuits during operation in the standby mode.

Similarly, the demand for ever higher performance from computers generally, and microprocessors and microcontrollers in particular, has led to various enhancements, including higher clock rates and simpler instructions sets. Consequently, the control and flexibility of clock speeds and rates for all integrated circuits has become critical. Known control systems for oscillators used to generate clock signals for such circuits tend to be simplistic and/or rely primarily on pre-wired hardware circuits or predetermined selectable frequencies, and therefore lack flexibility.

We have now devised an improved arrangement.

In accordance with the present invention, there is provided An electronic device for generating a clock signal for an integrated circuit, the device comprising at least two clock generation elements arranged and configured to generate a single clock signal at a clock output in response to an input signal and to operate in a mutually exclusive manner, the outputs of said clock generation elements being selectively connectable to said clock output, the device further comprising means for receiving a data pattern representative of a sequence of frequencies at which said clock signal is required to be generated, means for receiving data representative of the next frequency in said sequence, means for causing a clock generation element other than the clock generation element generating the clock signal at the immediately previous frequency in said sequence to generate a clock signal at said next frequency, means for causing the clock signal at the immediately previous frequency in said sequence to be disconnected from said clock output, and means for causing the clock signal at the next frequency in said sequence to be connected to said clock output; characterized in that the clock generation element being caused to generate a clock signal at each frequency in said sequence is independent of the value of said frequency.

Preferably, the clock signal at the immediately previous frequency in the sequence is caused to be disconnected from the clock output prior to connection of the clock signal at the next frequency in the sequence to the clock output. Generation of the clock signal at the next frequency in the sequence is preferably commenced prior to disconnection of the clock signal at the immediately previous frequency in the sequence to the clock output (and prior to connection of the clock signal at the next frequency in the sequence to the clock output).

Disconnection from the clock output of the clock signal at the immediately previous frequency in the sequence is preferably caused to occur when that clock signal is low. Equally, connection to the clock output of the clock signal at the next frequency in the sequence is preferably caused to occur when that clock signal is low.

The clock generation elements beneficially comprise programmable ring oscillators, and the device preferably further includes a variable programmable delay element for receiving data representative of the duration of a clock cycle of each frequency in the sequence. The variable programmable delay element is preferably arranged and configured to cause the respective clock generation element to generate a clock signal at the required frequency.

The data pattern is preferably derived from, or comprises, a series of requests for a change of frequency of the clock signal. The electronic device beneficially further comprises an arbiter for determining the order in which such requests are to be effected. In one embodiment of the invention, the arbiter orders the requests for action on a "first-come-first-served" basis. In this case, if two requests are received at substantially the same time, the arbiter is beneficially arranged to randomly select the order in which those two requests are to be actioned.

The device may further comprise an event controller for controlling the order in which the clock generation elements are caused to commence and cease generation of a clock signal and/or the order in which the clock signals are connected and disconnected from the clock output. The device may be arranged and configured to temporarily disconnect all of the clock generation elements from the clock output, in response to a request to do so.

The present invention, therefore, provides a mechanism for generating a clock signal for an integrated circuit, or part of one, so that the frequency can be safely changed discretely (i.e. from any value to any other value), with predictable latency of one clock cycle, the mechanism also being compatible with any clock gating arrangements. No external oscillator is required, and the mechanism has been found to be compatible with standard structural testing solutions (e.g. scan chains).

The present invention also extends to a method of generating a clock signal for an integrated circuit, the method comprising providing at least two clock generation elements arranged and configured to generate a single clock signal at a clock output in response to an input signal and to operate in a mutually exclusive manner, the outputs of said clock generation elements being selectively connectable to said clock output, the method further comprising receiving a data pattern representative of a sequence of frequencies at which said clock signal is required to be generated, receiving data representative of the next frequency in said sequence, causing a clock generation element other than the clock generation element generating the clock signal at the immediately previous frequency in said sequence to generate a clock signal at said next frequency, causing the clock signal at the immediately previous frequency in said sequence to be disconnected from said clock output, and causing the clock signal at the next frequency in said sequence to be connected to said clock output; characterized in that the clock generation element being caused to generate a clock signal at each frequency in said sequence is independent of the value of said frequency.

The invention further extends to a method of manufacturing an electronic device as defined above, and to a clock signal generated by means of the device or method defined above.

These and other aspects of the present invention will be apparent from, and elucidated with reference to, the embodiment described hereinafter.

An embodiment of the present invention will now be described by way of example only and with reference to the accompanying drawings, in which.

Thus, the present invention is intended to provide a mechanism for generating a clock signal for an integrated circuit, or part of one, so that the frequency thereof can be safely changed discretely (i.e. from any initial value to any other subsequent value), with predictable latency of, for example, one clock cycle, which is also compatible with any other clock gating mechanisms. The invention does not require any external oscillator, and has been found to be compatible with standard structural testing solutions (e.g. scan chains). Such an invention finds its application in systems where frequency is changed for power or performance management.

U.S. Pat. Nos. 5,652,536, 5,291,528 and 4,855,615 all describe arrangements whereby the effective clock signal may be selected from two or more available clock signals, and a switching circuit is provided to enable switching between the clock signals.

U.S. Pat. No. 6,219,797 describes a microcontroller with a selectable oscillator source. The arrangement comprises an on-chip internal ring oscillator and an external crystal oscillator, and a user is able to select which of these two oscillators to use as the main source clock to the system. The internal ring oscillator is selected when the microcontroller is required to operate in a low power mode.

U.S. Pat. No. 5,208,557 describes an arrangement including a dual frequency oscillator connected to a charge pump. The dual frequency oscillator receives a SELECT signal and, in response thereto, supplies an oscillating signal having a predetermined frequency to the charge pump. The output signal of the oscillator has a first frequency f1 when the SELECT signal is low and a second frequency f2 when the SELECT signal is high. Thus, in standby mode, the SELECT signal is low, and the frequency f1 of the output signal from the oscillator is low. In an active mode, the SELECT signal is high, and the frequency f2 of the output signal from the oscillator is high.

Figure 1:
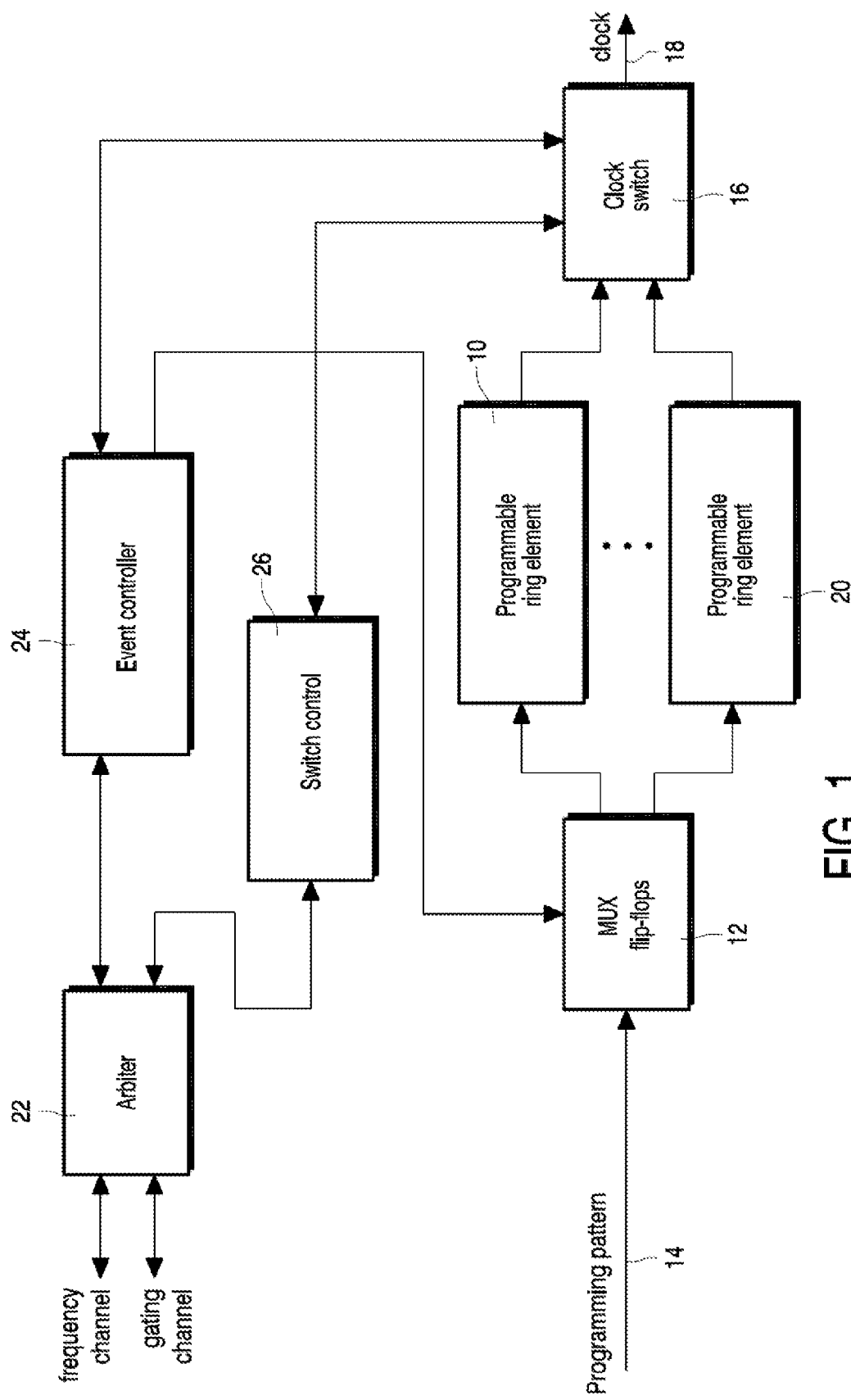
FIG. 1 is a schematic block diagram illustrating an electronic device according to an exemplary embodiment of the present invention.

Referring to FIG. 1 of the drawings, a clock generation circuit according to an exemplary embodiment of the present invention comprises two programmable ring oscillators 10, 20. Ring oscillators are widely known in the field of integrated circuit manufacture and usually comprise simple inverting logic circuits as stages. The current output at each stage takes a certain time to charge and discharge an input capacitance of the following stage to a threshold voltage. The stages are connected in series to form a cascade loop, so that at a certain frequency a 180° phase shift is imparted to signals passing around the loop. Provided the loop gain is large enough, the signals soon become non-linear resulting in square-wave oscillations which can be used for a variety of purposes, in particular for digital signal processing. In metal-oxide (MOS) integrated circuits, ring oscillators are commonly used to drive charge pump circuits. In particular, ring oscillators are provided in BiCMOS or bipolar and also in pure CMOS circuits. A preferred application of ring oscillators is the provision in data and clock recovery circuits or in phase locked loop (PLL) circuits.

The ring oscillators 10, 20 in this exemplary embodiment of the present invention are used in a mutually exclusive manner, in the sense that one is used to generate a current frequency and the other will be used generate the next (requested) frequency. A variable programmable delay element (not shown) is also provided in the oscillating circuit.

A multiplexer 12, comprising a plurality of flip-flops provides the input stage to both of the oscillators 10, 20, and has as its input a programming pattern 14 for providing, to the variable programmable delay element, data representative of the sequence of frequencies at which the clock signal is required to be generated. Such data is, more specifically, representative of the duration of a clock cycle of each frequency in the sequence, such that it may be determined from said clock cycle duration, the corresponding frequency at which the clock signal is required to be generated. The outputs of both of the oscillators 10, 20 are connected to a clock switch 16, from which the generated clock signal 18 is output.

The device further comprises an arbiter 22 for receiving requests to change the frequency of the clock signal and selecting the next request to be effected. Each request equates to a required change of frequency of the clock signal, as indicated by the programming pattern 14. This programming pattern 14 will tend to come from an external source, for example, a small circuit arranged to control performance and power management of the integrated circuit, or it may be generated by software, However, the invention is not intended to be limited in this regard.

In this exemplary embodiment of the invention, the arbiter 22 selects the next request on a first-come-first served basis. If two requests are received at the same time, the arbiter 22 may be arranged to select the next request therefrom at random. An event controller 24 is arranged and configured to accept a request from the arbiter 22 for a change of frequency, and then cause the new frequency to be captured by the MUX flip-flops 12 (i.e. the input multiplexed registers). The event controller 24 also controls the switching between the two ring oscillators 10, 20. The arbiter 22, together with a switch control element 26, is used to enable clock gating (which will be explained further below).

An arbiter is a well known interface circuit that controls a communication protocol on the basis of assigning priority to a particular input signal selected from a plurality of input signals in order to determine a processing sequence for the input signals. The priority assignment may be based on temporal aspects of the signals, e.g. the order of arrival at the arbiter's inputs. Thus, in the case of the arbiter 22 of included in this exemplary embodiment of the present invention, it simply decides which of a plurality of requests was received by its input channels first, and causes that request to be routed to its output channel.

A series of requests, corresponding to required changes of frequency of clock signal required to be generated, are received from an external source by the arbiter 22. The arbiter 22 creates a sequence or programming pattern 14 according to the order in which the requests were received. It should be noted that the programming pattern and requests comprise a data pattern indicating a required delay between cessation of generation of the clock signal at a current frequency and commencement of generation of the clock signal at the next required frequency, and because this delay equates to one clock cycle at the next frequency, it is indicative of the value of the next required frequency. The programming pattern 14 is fed to the MUX 12 (including the variable programmable delay element) and the event controller 24.

Figure 3:
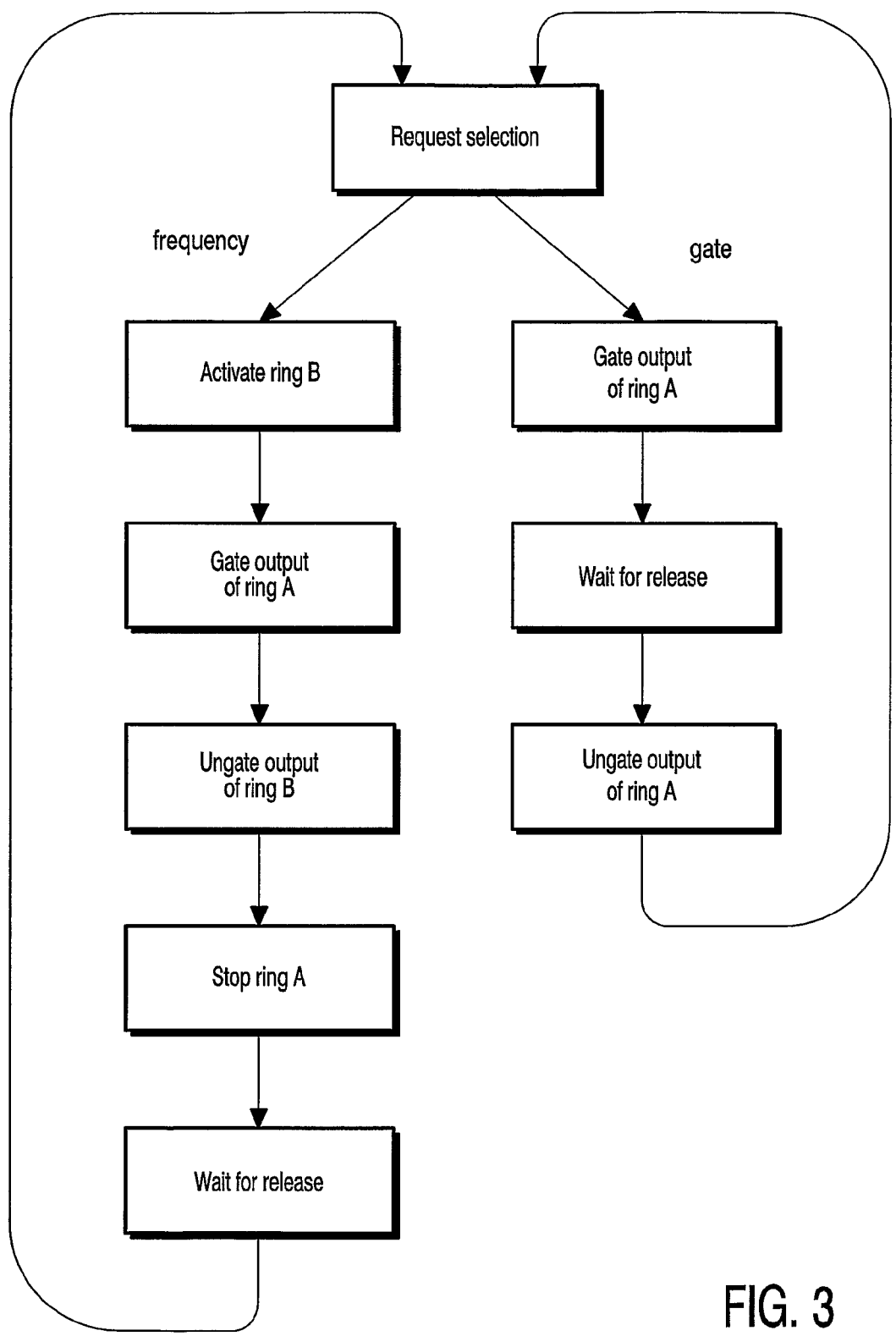
FIG. 3 is a schematic flow diagram illustrating the process flow of the device, of FIG. 1.

Referring to FIG. 3 of the drawings, when the event controller 24 receives a request, it first activates the currently idle ring oscillator (say 20, in this case) with the next required frequency as specified by the pattern 14 provided through the MUX flip-flops 12. This will not interfere with the currently oscillating ring oscillator 10 since the clock switch 26 allows only the output from ring oscillator 10 to be transmitted to the clock output. It then causes the output of the currently operative ring oscillator 10 to be gated, when the clock signal goes low. Next, it causes the previously gated output of ring oscillator 20 to be ungated when its output signal goes low, and then it actually de-activates ring oscillator 10 (i.e. the ring is open to avoid oscillation). This entire operation requires less than one clock cycle of the new clock frequency. At this point, the event controller 24 waits for request withdrawal and then returns to its original state.

Figure 4:
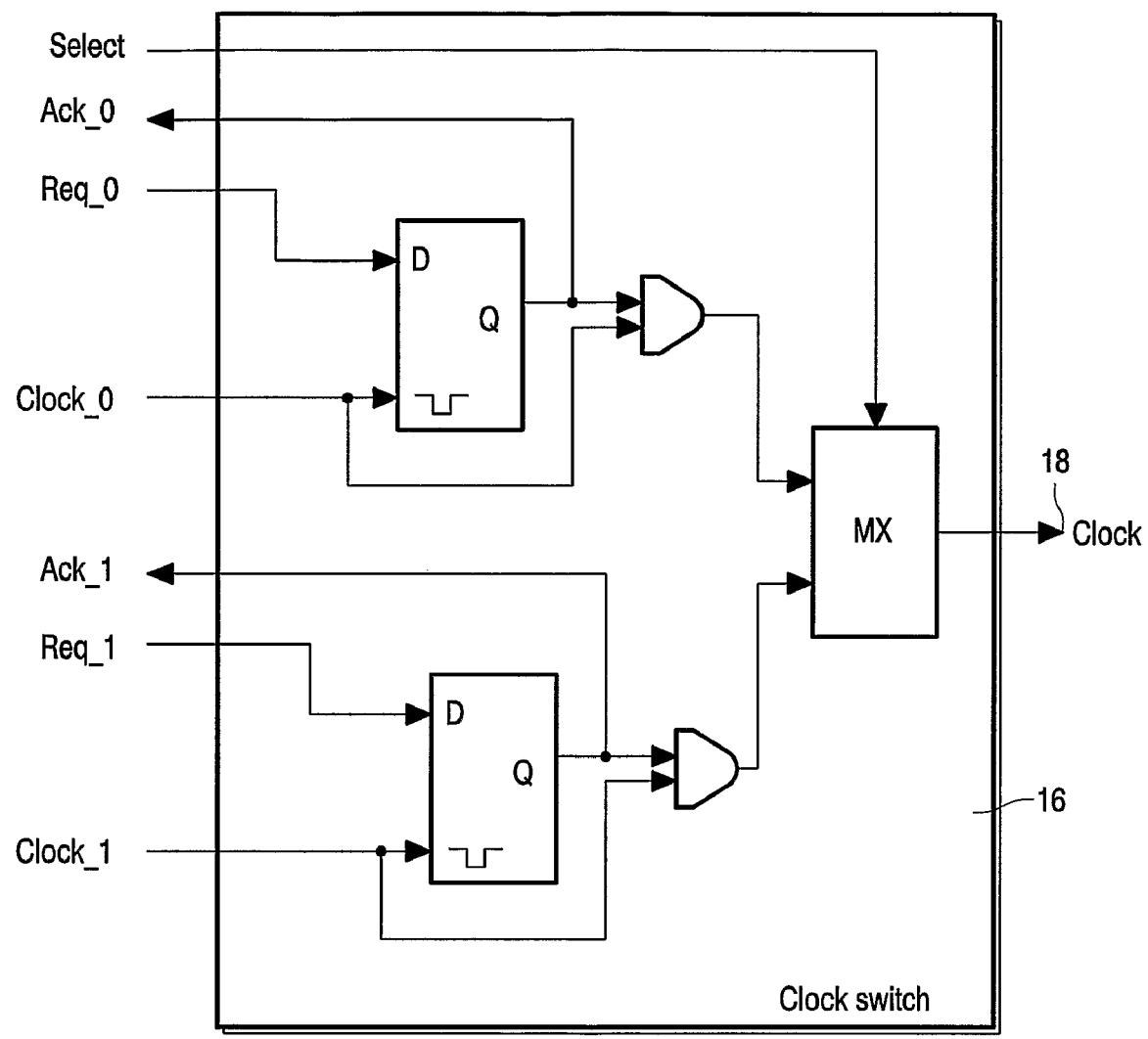
FIG. 4 is a schematic diagram illustrating the basic structure of the clock switch included in the device of FIG. 1.

It is also possible to pause the clock generation device of FIG. 1. This function is achieved by means of the clock switch 26 (an exemplary embodiment of which is illustrated in FIG. 4 of the drawings). Referring again to FIG. 3, in the event that a request to pause the clock generation device is received, the clock switch 26 causes the previously ungated ring oscillator 10 to be gated, then waits for the request to be withdrawn, before ungating the ring oscillator 10.

Figure 2:
FIG. 2 illustrates the output signal obtained from the device of FIG. 1.

It will be apparent from the above description, that the clock switch 26 is employed to change the frequency at the clock output when the clock of both ring oscillators is low, thereby avoiding glitches on the clock and also to achieve the correct waveforms (see FIG. 2).

It should be noted that the above-mentioned embodiment illustrates rather than limits the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other 0 than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. An electronic device for generating a clock signal for an integrated circuit, the device comprising:
   at least two oscillators configured to generate a single clock signal at a clock output in response to an input signal and to operate in a mutually exclusive manner, the outputs of said oscillators being selectively connectable to said clock output;
   means for receiving a data pattern representative of a sequence of two or more frequencies at which said clock signal is required to be generated;
   means for causing an oscillator other than the oscillator generating the clock signal at the immediately previous frequency in said sequence to generate a clock signal at a next frequency in said sequence;
   means for causing the clock signal at the immediately previous frequency in said sequence to be disconnected from said clock output; and
   means for causing the clock signal at the next frequency in said sequence to be connected to said clock output;
   wherein the oscillator being caused to generate a clock signal at each frequency in said sequence is independent of the value of said each frequency.

2. The electronic device as recited in claim 1, wherein the clock signal at the immediately previous frequency in said sequence is caused to be disconnected from said clock output prior to connection of the clock signal at the next frequency in the sequence to said clock output.

3. The electronic device as recited in claim 1, wherein generation of the clock signal at said next frequency in said sequence is commenced prior to disconnection of the clock signal at the immediately previous frequency in the sequence from the clock output.

4. The electronic device as recited in claim 1, wherein connection of the clock signal at the next frequency in said sequence to said clock output is caused to occur when said clock signal is low.

5. The electronic device as recited in claim 1, wherein disconnection of the clock signal at said immediately previous frequency in said sequence from said clock output is caused to occur when said clock signal is low.

6. The electronic device as recited in claim 1, wherein said at least two oscillators comprise programmable ring oscillators.

7. The electronic device as recited in claim 6, comprising a variable programmable delay element for receiving data representative of the duration of a clock cycle of each frequency in said sequence.

8. The electronic device as recited in claim 7, wherein said variable programmable delay element causes the respective oscillator to generate a clock signal at the required frequency.

9. The electronic device as recited in claim 1, wherein said data pattern is derived from, or comprises, a series of requests for a change of frequency of said clock signal.

10. The electronic device as recited in claim 9, further comprising an arbiter for determining the order in which said requests are to be effected.

11. An electronic device according to claim 10, wherein said arbiter orders said requests for action on a first-in-first-out basis.

12. The electronic device as recited in claim 11, wherein if two requests are received at substantially the same time, the arbiter is arranged to randomly select the order in which action is taken on these two requests.

13. The electronic device as recited in claim 1, further comprising an event controller for controlling the order in which said oscillators are caused to commence and cease generating a clock signal and or the order in which said clock signals are connected and disconnected from said clock output.

14. The electronic device as recited in claim 9, arranged and configured to temporarily disconnect all of the oscillators from the clock output, in response to a request to do so.

15. A method of generating a clock signal for an integrated circuit, the method comprising:
   providing at least two oscillators arranged and configured to generate a single clock signal at a clock output in response to an input signal and to operate in a mutually exclusive manner, the outputs of said oscillators being selectively connectable to said clock output;
   receiving a data pattern representative of a sequence of two or more frequencies at which said clock signal is required to be generated;
   receiving data representative of the next frequency in said sequence;

causing an oscillator other than the oscillator generating the clock signal at the immediately previous frequency in said sequence to generate a clock signal at said next frequency;

causing the clock signal at the immediately previous frequency in said sequence to be disconnected from said clock output; and causing the clock signal at the next frequency in said sequence to be connected to said clock output;

wherein the oscillator being caused to generate a clock signal at each frequency in said sequence is independent of the value of said each frequency.

* * * * *